May 29, 1928.
A. HOUSTON
INDICATING DEVICE
Filed April 28, 1921
1,671,290
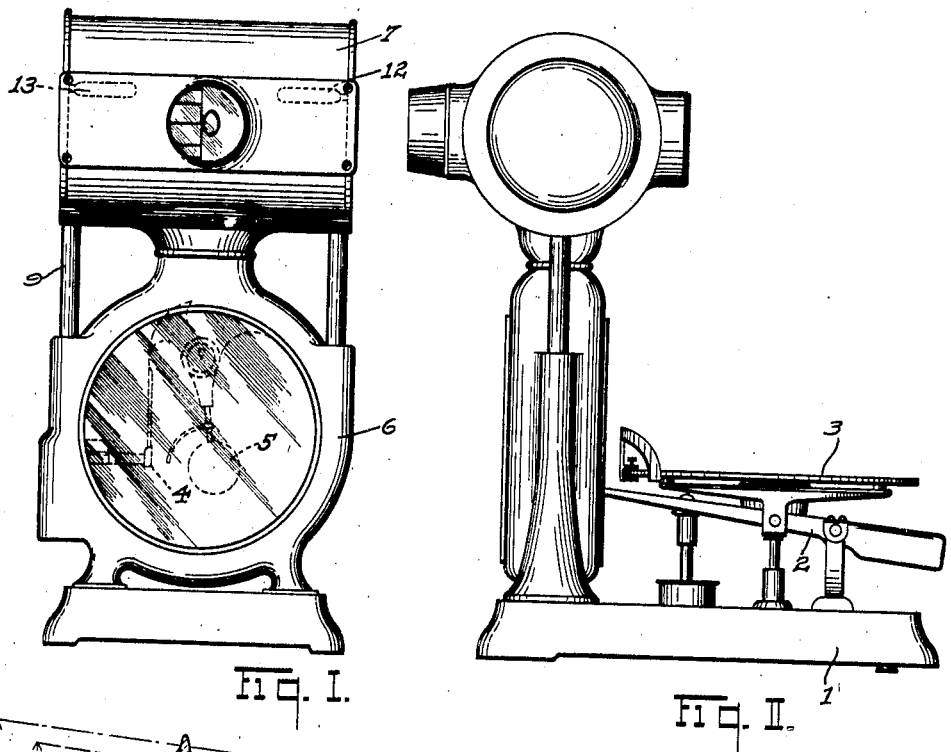
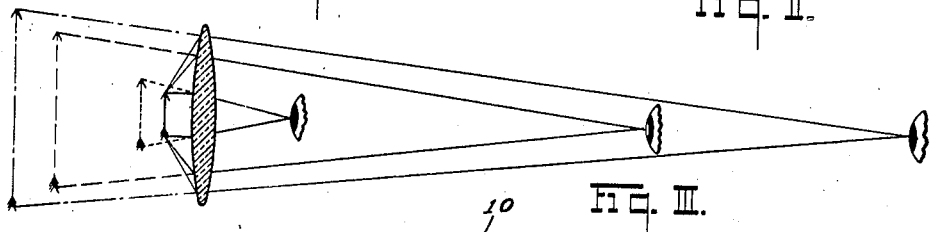
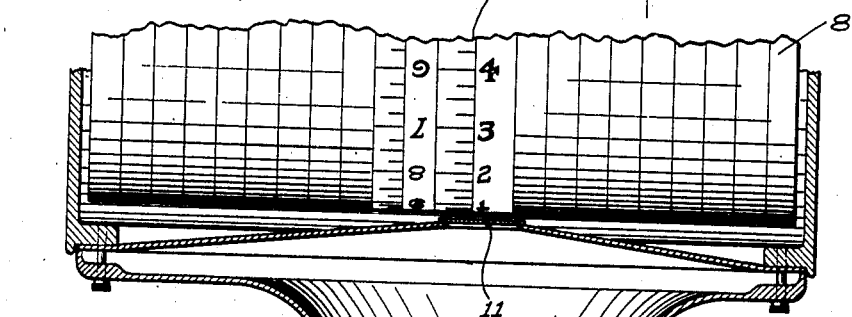
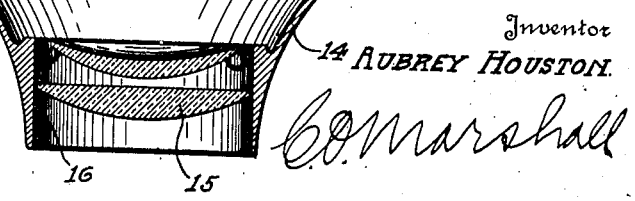
Inventor
AUBREY HOUSTON.
Attorney Patented May 29, 1928.

1,671,290

UNITED STATES PATENT OFFICE.

AUBREY HOUSTON, OF CHRISTCHURCH, NEW ZEALAND, ASSIGNOR TO TOLEDO SCALE COMPANY, OF TOLEDO, OHIO, A CORPORATION OF NEW JERSEY.

INDICATING DEVICE.

Application filed April 28, 1921. Serial No. 465,286.

This invention relates to indicating devices, and particularly to indicating devices for weighing scales, and its principal object is to provide means whereby an indication in comparatively small characters may be read from a distance.

Proprietors of retail stores employing sales people often wish to be able to see from a distance whether or not the sales people are careful in giving accurate weights. It is quite impossible to do this on ordinary computing scales, for the reason that the weight indications on the customer's side of the scale are so small as to be unreadable from a distance of more than a few feet. With the even-balance type of scale the merchant could see from a distance whether or not the scale came to a proper balance. There is nothing, however, except the indicator upon an automatic scale to show whether or not the sales person is giving the proper weight. It is a more specific object of my invention, therefore, to provide means for indicating whether or not the weight given on an automatic scale is accurate.

Other objects and advantages will be apparent from the following description, in which reference is had to the accompanying drawings illustrating a preferred embodiment of my invention and wherein similar reference numerals designate similar parts throughout the several views.

In the drawings:—

Figure 1 is a rear elevation of a weighing scale of the cylinder type equipped with the distance-reading device of my invention;

Figure 2 is a side elevation of the same;

Figure 3 is a diagram which is explanatory of the operation of my device; and

Figure 4 is an enlarged fragmentary horizontal section through a portion of the chart housing equipped with my device, showing its relation to the cylindrical chart.

My invention is applicable to any automatic scale having a movable chart and I have shown it as applied to a cylinder scale for purposes of illustration only. Since my invention does not reside in the scale per se and since the combination of my invention may include another form of scale than that illustrated, I will describe the scale in such detail only as will suffice to clearly show the connection of the distance-reading device therewith.

The base 1 supports the main lever 2 of the scale, which carries the platform 3 in the usual manner. The nose 4 of the lever 2 is connected to a pendulum 5 which is pivotally mounted within the housing 6. The upper portion 7 of the housing 6 contains the rotatable cylindrical chart 8 which is connected by means of a pinion and rack rod extending downwardly through the tube 9 to the lever 2, so that as the lever is depressed by a load on the platform the chart is rotated.

The chart is covered with computations (not shown) certain of which are visible through a slit on the side of the housing toward the platform. The chart also carries a band of reversely numbered graduations 10, certain of which are visible through an opening 11 on the rear or customer's side of the scale and thereby indicate the weight of the load on the platform to the customer. Since these graduations are necessarily close together and the numbers designating them necessarily small, it is ordinarily impossible to read them from a distance greater than a few feet, even though they be brightly illuminated by the electric lamps 12 and 13. By means of my distance-reading device it is, however, possible to read the indication on the customer's side of the scale from a distance of 100 ft. or more.

In working out my device I have taken advantage of the very striking property of convex lenses—viz, that when an object to be magnified is placed between the lens and its principal focus, the virtual image increases in size as the observer's eye is moved away from the lens. It is only possible to take advantage of this property for telescopic or distance-reading purposes if the lens employed is quite large, since the size of the virtual image cannot be appreciably greater than the size of the lens and since the virtual image of a figure, owing to its irregular shape, must usually be considerably smaller. A figure viewed through an ordinary lens would, therefore, be illegible to most persons at a distance greater than a few feet.

By employing a lens having a diameter of 3 or 4 inches and a focal length of several inches, figures of approximately 1/8 in. in height appear to a nearby observer to be very little magnified, but as the observer moves away from the scale the virtual image increases in size and therefore remains readable even at a distance of 50 or 100 ft., since from such a comparatively great distance it appears to be 2 or 3 inches in height, and when the chart is brightly illuminated, as charts in electrically-lighted scales usually are, the figure behind the lens stands out with great clearness.

The lens frame or mounting 14 is preferably so constructed that it can be substituted for the usual back plate of the chart housing to which it is to be applied (see Figure 4), and the lens 15, which, in order that the virtual image of the indication may be orthoscopic even when viewed through portions of the lens adjacent its edge, is of the compound type, is secured within a tube 16 which is slidably mounted in a cylindrical opening in the frame so that the lens may be moved back and forth to position it in the best focal relation to the chart.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. In a weighing scale, in combination, weighing mechanism, a cylindrical chart connected thereto, a housing adapted to enclose said chart, a lens-supporting frame positioned on the rear or customer's side of the housing, and a compound magnifying lens of large diameter supported by said frame and so positioned that a portion of the chart is visible therethrough, said visible portion of the chart lying between the lens and its principal focus, whereby an orthoscopic virtual image of such portion of the chart is rendered visible from a comparatively great distance.

2. In a weighing scale, in combination, weighing mechanism, a movable chart connected thereto, a housing adapted to enclose said chart, a lens supporting frame positioned on said housing, and a compound magnifying lens of large diameter supported by said frame and so positioned that a portion of the chart is visible therethrough, said visible portion of the chart lying between the lens and its principal focus whereby a substantially orthoscopic virtual image of such portion of the chart is rendered visible from a comparatively great distance.

AUBREY HOUSTON.